C. VALLONE.
HOLDING DEVICE FOR SLIDING SIDE CRIBS.
APPLICATION FILED SEPT. 11, 1913.
1,179,684.
Patented Apr. 18, 1916.
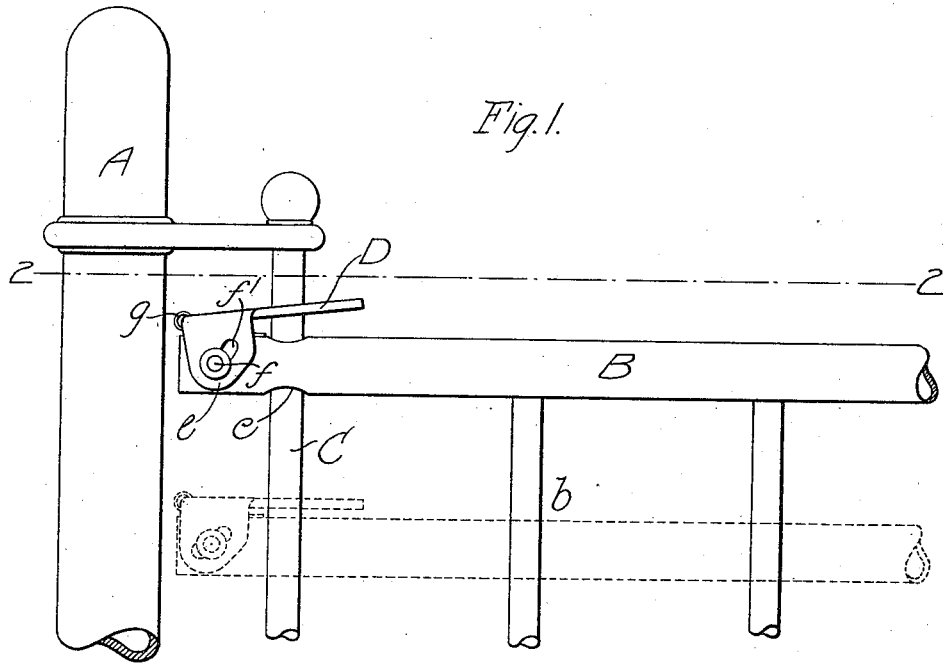
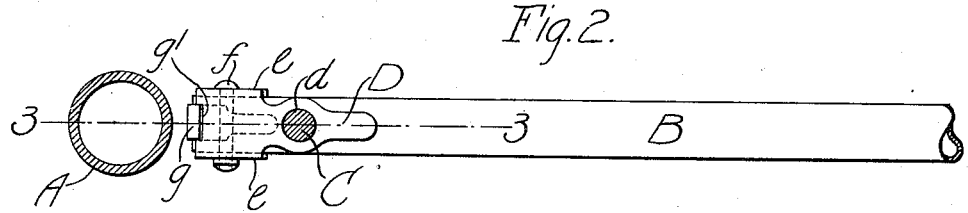
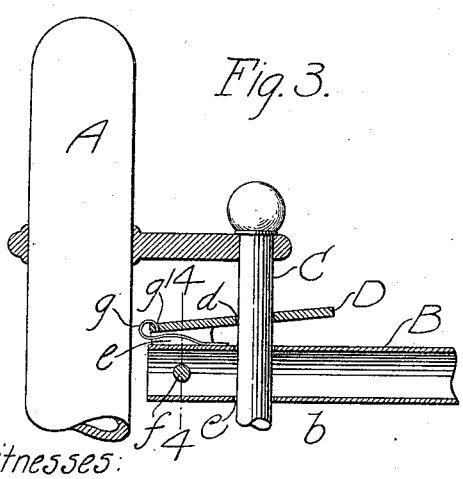
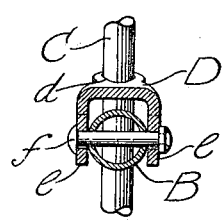
Witnesses:
A. T. Robertson
A. S. Dimond
Inventor
Charles Vallone
by Wilhelm, Parker & Hard
Attorneys

UNITED STATES PATENT OFFICE.

CHARLES VALLONE, OF BUFFALO, NEW YORK, ASSIGNOR TO BARCALO MANUFACTURING COMPANY, OF BUFFALO, NEW YORK.

HOLDING DEVICE FOR SLIDING-SIDE CRIBS.

1,179,684.  Specification of Letters Patent.  Patented Apr. 18, 1916.

Application filed September 11, 1913. Serial No. 789,248.

*To all whom it may concern:*

Be it known that I, CHARLES VALLONE, a citizen of the United States, residing at Buffalo, in the county of Erie and State of New York, have invented a new and useful Improvement in Holding Devices for Sliding-Side Cribs, of which the following is a specification.

This invention relates to holding devices or clutches for the sides of children's cribs having vertically sliding sides or side railings, and the purpose of the invention is to provide desirable and practical means of simple and inexpensive construction which will operate automatically to secure the sliding side in any position to which it may be lifted and which can be easily and conveniently released to permit the sides to be lowered.

In the accompanying drawings: Figure 1 is a fragmentary side elevation of a child's crib provided with a holding device for the side embodying the invention. Fig. 2 is a plan thereof partly in section in line 2—2, Fig. 1. Fig. 3 is a sectional elevation thereof in line 3—3, Fig. 2. Fig. 4 is a transverse sectional elevation thereof in line 4—4, Fig. 3.

Like reference characters refer to like parts in the several figures.

A represents the corner post of one of the end frames of a crib, and B the top horizontal rail of one of the sliding sides or side railings $b$ of the crib. The side $b$, as usual, is arranged to slide on stationary vertical guide rods at the ends of the crib which are embraced by guide loops or parts on the ends of the top and bottom rails of the sliding side. C indicates one of the guide rods and $c$ a guide hole in the top rail B for the passage of the guide rod. The top rail shown consists of a cylindrical tube, but it could be a solid rod if desired.

D represents a holding device or clutch which is mounted on the end of the top rail B and slidably engages the guide rod C for holding the side $b$ when raised. One of these clutches is provided at each end of the side, but only one is shown, since the clutches are alike and are similarly arranged, except that they extend in opposite directions or toward each other from the opposite ends of the rail B.

The clutch device consists of a lever arranged lengthwise above the top rail and pivotally connected at its outer end at a point outwardly beyond the guide rod C. The clutch lever is provided between its ends with a hole $d$ through which the guide rod passes. This hole is of a size and shape to allow the lever to slip on the guide rod and permit the side to be raised or lowered when the inner end of the lever is pressed downwardly or toward the top rail, and to grip the rod and prevent the lever from sliding thereon when the lever is in an inclined position, as shown in Figs. 1 and 3. The lever is provided at its outer end with depending ears or parts $e$ which straddle the top rail and are connected thereto by a pin bolt or rivet $f$ which extends through the top rail and through elongated slots $f'$ in said ears. A spring $g$ arranged between the lever and the top rail normally holds the lever in the inclined position shown in Figs. 1 and 3 in which it grips the guide rod. Preferably this spring has a bent outer end hooked in a slot $g'$ in the end of the lever, whereby the spring is secured to the lever.

When the side is raised the spring $g$ allows the clutch lever to swing toward the top rail B far enough to prevent it from gripping the guide rod and the side can be slid upwardly on the guide rod without the necessity of actuating the clutch lever by hand. When the side is released it will be prevented from descending by the clutch lever which will assume its inclined position under the action of the spring $g$ and the tendency of the lever to grip the guide rod, so that the side will be held securely in the raised position. A downward pressure on the side will, however, cause the lever to tightly grip the guide rod and prevent the downward movement of the side unless the clutch levers D are released by pressing their inner ends downwardly toward the top rail. This can be done by a pressure of the thumbs on the inner ends of the levers while the hands grasp the top rail.

The described arrangement of the clutch levers places them in a convenient position for actuation by the thumbs when the hands are in the position in which they will naturally be placed in grasping the top rail to raise or lower the side. By connecting the lever to the top rail by the slotted ears straddling the rail, as described, the outer end of the spring $g$ constitutes in effect the fulcrum for the lever and the lever is adapted to assume the same positions as if it were pivoted to a fixture projecting upwardly from the top rail B. An efficient gripping action of the lever is thus insured without requiring the more expensive pivot fixture for the lever to be provided. As the clutch levers tightly grip the guide rods they prevent any play of the top rail on the guide rods and therefore prevent the rattling of the side with the consequent objectionable noise.

I claim as my invention:

1. In a crib, the combination with a side arranged to slide on a guide rod adjacent to each of its ends, said side having end portions projecting outwardly beyond said guide rods, of a clutch lever pivotally mounted on said side at a point outwardly beyond said guide rod and extending lengthwise along the edge of said side to a point inwardly beyond said guide rod, said lever having a part slidably and frictionally engaging said guide rod, and a spring which acts on said lever and causes it to grip said guide rod and prevent the movement of said side in one direction.

2. In a crib, the combination with a side arranged to slide on guide rods adjacent to its ends, of a clutch lever arranged lengthwise above the top of said side and having ears which straddle the top of said side and have a slip connection therewith, said lever having a hole through which said guide rod passes, and a spring located beneath said lever between said ears which normally holds said lever at an inclination to the top of said side.

3. In a crib, the combination with a side arranged to slide on guide rods adjacent to its ends, of a clutch lever arranged lengthwise of said side and having an ear projecting therefrom beside said side, a pin and slot connection between said ear and said side by which said lever is movably retained in place on said side, said lever having a hole through which said guide rod passes, and a spring by which said lever is fulcrumed and which bears on said side and holds said lever in frictional engagement with said guide rod.

4. In a crib, the combination with a side having a horizontal rail, and vertical guide rods adjacent the ends of the side on which the side is adapted to slide, of friction clutch levers at the ends of said side and coöperating with said guide rods for holding the side in different positions of adjustment, each of said clutch levers comprising a plate which extends lengthwise along said rail in the vertical plane thereof and is provided with a hole through which the adjacent guide rod passes, and ears which project from said plate and straddle said horizontal rail and are movably connected therewith at one side of the guide rod, and springs for moving said clutch levers to holding position.

Witness my hand this 5th day of September, 1913.

CHARLES VALLONE.

Witnesses:
A. W. KIRTON,
T. H. TURNER.